June 28, 1938. H. F. SMITH 2,122,161
REFRIGERATING APPARATUS
Filed April 27, 1933 6 Sheets-Sheet 4

Inventor
Harry F. Smith
By Spencer Hardman and Fehr
Attorneys

June 28, 1938.   H. F. SMITH   2,122,161
REFRIGERATING APPARATUS
Filed April 27, 1933   6 Sheets-Sheet 5

Inventor
Harry F. Smith
By Spencer Hardman and Fehr
Attorneys

Patented June 28, 1938

2,122,161

UNITED STATES PATENT OFFICE 2,122,161

REFRIGERATING APPARATUS

Harry F. Smith, Dayton, Ohio, assignor, by mesne assignments, to General Motors Corporation, a corporation of Delaware Application April 27, 1933, Serial No. 668,242

24 Claims. (Cl. 62—5)

This invention relates to refrigerating apparatus and particularly to refrigerating apparatus of the intermittent absorption type.

Refrigerating apparatus of the intermittent absorption type consists essentially of three elements, namely, a generator-absorber, a condenser, and an evaporator. The generator-absorber is charged with an absorbent material, for example solid calcium chloride, capable of absorbing and liberating large quantities of a refrigerant gas, such as ammonia, at different degrees of temperature. Such a system operates intermittently, that is, during one cycle of operation known as the generating cycle, heat is applied to the generator-absorber. The heating of the generator-absorber liberates the ammonia gas from the calcium chloride, the liberated gas passing to the condenser wherein the ammonia gas is condensed, and the condensed liquid ammonia passing from the condenser to the evaporator wherein it collects. During the other cycle of operation, known as the absorbing cycle, or the refrigerating cycle, the generator-absorber is cooled, thereby reducing the pressure within the entire refrigerating system and causing an evaporation of the liquid refrigerant within the evaporator. The evaporation of the liquid refrigerant within the evaporator cools the interior of the refrigerated compartment wherein the evaporator is located. The vapors resulting from the evaporation of the liquid within the evaporator pass back to the generator-absorber and the vapors are absorbed therein by entering into chemical combination with the calcium chloride.

Such is the type of absorption refrigerating system to which my invention relates and it has for its object to provide a completely automatic and commercially practicable refrigerating apparatus of the intermittent absorption type in a manner hereinafter pointed out. These objects are accomplished by providing improved means for controlling the initiation and termination of the generator-absorber heating cycle and cooling cycle, which controlling means assures the driving out of a complete predetermined charge of refrigerant from the absorbent material contained within the generator-absorber and which likewise assures the absorption of a predetermined complete charge of refrigerant in the absorbent material before the heat is again turned on; by providing improved temperature regulating means whereby a selective range of substantially constant temperatures is available to the user by the simple manipulation of a lever located within easy reach; by providing automatic means for preventing the ingress of large quantities of heat to the evaporator during the generating cycle; by providing an improved evaporator construction whereby self and automatic defrosting is accomplished during each generating cycle but wherein the ice formed during the refrigerating cycle is not permitted to melt during the generating cycle; by providing an improved generator-absorber construction, an improved condenser structure, and by the provision of other elements and constructions as will appear more fully in the following specification wherein a preferred form of my invention is disclosed.

Further objects and advantages of the present invention will be apparent from the following description, reference being had to the accompanying drawings, wherein a preferred form of the present invention is clearly shown.

Figure 1:
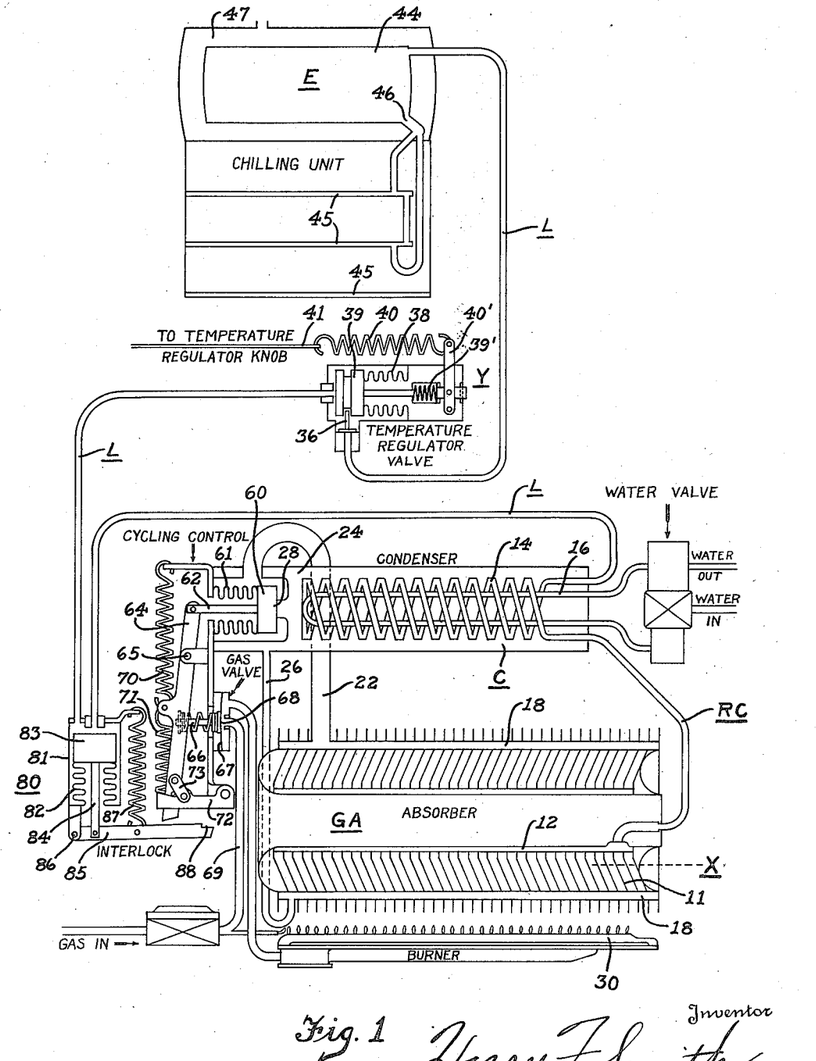
Fig. 1 is a diagrammatic view of a refrigerating system embodying features of my invention.
Figure 2:
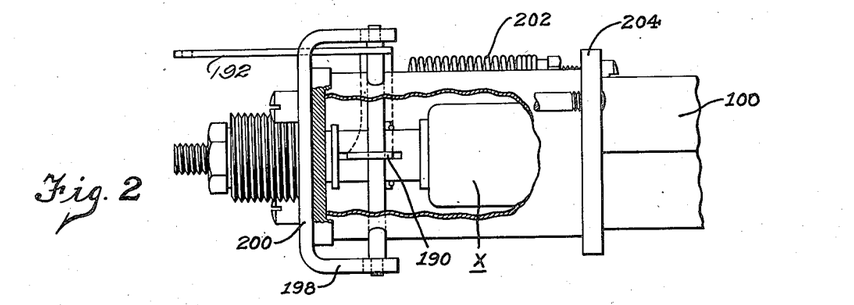
Fig. 2 is a top view of the temperature regulator valve.

In order that the structural details of the various parts and elements making up the system, as well as the various automatic controls may be thoroughly understood, the invention in diagrammatic form has been illustrated in Fig. 1. Therein is shown a generator-absorber GA, the interior of which is connected by a conduit RC with the inlet end of the condenser C, the outlet end of the condenser C being connected by means of the conduit L with the evaporator E.

The absorber is shown diagrammatically as constructed to permit the rapid transfer of heat to and from the absorbent material when the refrigerant is being released and absorbed. This heat transfer mechanism consists essentially of steel fins or pans indicated by the reference character 11 extending from the outside surface of the absorber to the center thereof, between which pans powdered absorbent material is packed, for instance, by a centrifugal filling machine. An opening indicated by the reference character 12 passes through the center of these heat conducting fins or pans and provides a passage for the refrigerant gas into and out of the interior of the absorber.

The condenser C is shown diagrammatically as consisting essentially of a coil of tubing, indicated by the reference character 14, through which the ammonia passes from the conduit RC to the conduit L. The coil 14 is in intimate contact with a corresponding circulating water coil indicated by the reference character 16.

The apparatus so far described operates substantially as follows. When heat is applied to the generator-absorber from any source, the ammonia is liberated from the absorbent material within the generator-absorber. This liberated ammonia gas passes through the tube RC to the condenser coil 14, where it gives off its heat to the cooling water and is consequently condensed to a liquid. While condensation is taking place, the ammonia gas given off by the absorbent forces the condensed liquid ahead of it, up through the conduit L into the evaporator E. After a complete charge of ammonia gas is driven out of the generator-absorber, the heating is discontinued and the generator-absorber is cooled. The cooling of the generator-absorber lowers the pressure within the system and the liquid refrigerant contained within the evaporator E evaporates, absorbing its latent heat of evaporation from the atmosphere immediately surrounding the evaporator. The vapors, resulting from the evaporation of liquid refrigerant pass back through the conduit L, condenser coil 14, to the generator-absorber GA wherein they are reabsorbed with the liberation of heat by the solid absorbent.

The means for heating and cooling the generator-absorber consist essentially of a closed circuit containing a volatile liquid, which volatile liquid is permitted to condense on the surface of the generator-absorber to provide for the ingress of heat to the generator-absorber during the generating period and to evaporate on the surface of the generator-absorber to remove heat therefrom during the refrigerating or absorbing period. By providing such a heating and cooling system, the generator-absorber is heated evenly, and hot spots occasioned by the use of a direct flame are avoided.

This heating and cooling means comprises a jacket indicated by the reference character 18 provided around the generator-absorber. This jacket is connected by a vapor conduit 22 to a corresponding jacket 24 located around the condenser coil 14 and the water coil 16. The lower end of the jacket 24 surrounding the condenser 14 is connected by means of a tube 26 to the lower end of the jacket 18. A valve passage 28, controlled by the movable valve disc or the plunger 60 is provided in this closed fluid circuit, which valve is closed during the heating cycle as also more fully described hereinafter.

The closed circuit comprising the heating and cooling systems contains a quantity of a low boiling point heat transfer fluid such as mono-fluoro-trichloro-methane $(CCl_3F)$. Sufficient fluid is contained in the circuit to surround the absorber. At the start of the generating period, the gas is turned on at the burner 30 and at the same time the vapor valve 28 is automatically closed in a manner that will be fully described hereinafter. The heating of the absorber jacket 18 will cause a part of the heat transfer liquid contained therein to vaporize and the pressure generated above the liquid level in the jacket 18 will force the liquid in the jacket 18 out through the liquid tube 26 up into the condenser jacket 24, completely filling the condenser jacket and the liquid tube 26 and leaving a liquid seal across the opening of the liquid tube in the bottom of the absorber jacket. In other words, the level of the heat transfer liquid in the absorber jacket will be lowered down to approximately the line indicated by the reference character X. Further vaporization of the liquid within the generator-absorber jacket 18 will cause the vapors to condense on the surface of the generator-absorber, giving up heat of condensation to the absorbent material therein.

The heating of the generator-absorber continues until a complete charge of ammonia gas has been driven out of the absorbent material, at which time the gas burner is turned off and the vapor valve 28 is automatically opened in a manner fully described hereinafter.

When the vapor valve 28 is opened, the hot vapor rises from the top of the generator-absorber jacket 18 through the conduit 22 into the relatively cool condenser 24 wherein it condenses to a liquid. At the same time, that is, when the valve opens, the cold heat transfer liquid, which has been stored in the condenser jacket during the generating period, drains by gravity back through the liquid conduit 26 to completely submerge the generator-absorber. Thus, during the absorption period a cold liquid bath is provided around the absorber structure.

As soon as the absorber is cooled by this liquid transfer agent, the absorbent material therein immediately starts absorbing the ammonia gas resulting from the evaporation of liquid refrigerant in the evaporator. The absorption of the refrigerating gas in the absorbent liberates large quantities of heat known as the heat of absorption or heat of chemical combination as well as the heat extracted from the cabinet by the evaporation of liquid refrigerant. This heat is given off to the cold liquid contained in the generator-absorber jacket 18, causing the vaporization of the liquid transfer agent. This heat-laden vapor then passes up through the vapor tube 22 and through the valve 28 into the condenser C wherein it is condensed by contact with the water coil 16. The liquid then passes by gravity down through the liquid tube 26 to again enter the absorber jacket wherein it absorbs more heat and the vaporization process is repeated. This process continues until a complete charge of ammonia is reabsorbed, at which time the heat is automatically started and the vapor valve is automatically closed in a manner fully described hereinafter.

Thus, it will be seen that the generator-absorber is first heated uniformly by the condensation of vapor generated in the generator-absorber jacket and then cooled evenly by the immersion of the absorber in a body of liquid heat transfer agent during the refrigerating or absorbing period.

During the generating period, when the ammonia gas is being driven from the generator-absorber, it becomes necessary to provide means for preventing condensation of this ammonia gas in the evaporator instead of in the condenser, for obviously, condensation will initially take place in the coldest part of the system. Since the evaporator has been maintained, during the refrigerating cycle, at a substantially low temperature, condensation will take place in the evaporator in preference to the condenser unless some means is provided to prevent such condensation. Condensation in the evaporator must be prevented, otherwise large quantities of heat in the form of heat of condensation will be dissipated to the compartment that is supposed to be cooled.

To prevent the ingress of heat to the evaporator or to prevent the condensation of ammonia within the evaporator, there is provided in the liquid line L a valve 36 somewhat on the order of a check valve, and means are provided for opening the valve 36 only after a pressure has been reached within the condenser which assures complete condensation of the refrigerant in the condenser. During the generating period, as ammonia gas is being driven through the conduit RC, condenser 14 and liquid line L, the pressure of the gas plus the weight of the valve 36 will hold the valve 36 closed, thus preventing any of the hot gas from entering the evaporator E. The pressure of the ammonia gas in the condenser then gradually builds up to a point where the gas starts to condense in the condenser into liquid ammonia. Now, inasmuch as the space for liquid ammonia in the condensing coil is small, it is soon filled with liquid. The ammonia pressure again starts building up until a certain pressure is reached sufficient to overcome the bellows indicated by the reference character 38, thereby causing a movement of the plunger 39 to the right against the tension of spring 39' as indicated in Fig. 1. This movement of the plunger 39 will tip the liquid valve 36 off its seat in a manner that will be obvious from the drawings and allow the liquid ammonia to flow to the evaporator E. This process continues intermittently, opening and closing the valve 36 until the complete charge of ammonia liquid is driven out of the condenser and stored in the evaporator. Thus, the valve 36 functions to prevent the passage of hot gas to the cold evaporator.

While the valve 36 prevents the ingress of hot gas to the evaporator, it does permit the passage of liquid refrigerant thereto and since the liquid refrigerant is cooled only to approximately the temperature of the cooling water used for cooling the condenser, some means must be provided for preventing the heat given off from the liquid refrigerant from warming up the cabinet. This is accomplished in two ways.

In the first place the top or the cylindrical part 44 of the evaporator E is connected to the bottom or plate part 45 of the evaporator in only one place 46 and the bottom plates are constructed so as to remain full of cold liquid at all times, thereby leaving a liquid seal over the opening 46. This is accomplished by so regulating the initiation of the heating cycle that the generating period will begin before the entire charge of liquid ammonia is absorbed from the evaporator. Thus, the bottom part of the evaporator is practically insulated from the top part and therefore no heat can be transmitted to the bottom plates of the cooling unit during the generating cycle.

Another feature is provided for preventing any heat in the top part of the evaporator from entering the cabinet. This is accomplished by providing a jacket 47 around the cylindrical portion 44, said jacket containing a congealing liquid having a freezing point above that which we do not want the evaporator temperature to rise. This congealing liquid is frozen solid during the absorption or refrigerating period. Consequently, when the warm liquid ammonia starts flowing into the evaporator during the generating period, due to the opening of the valve 36, the heat contained in the liquid ammonia is immediately dissipated to the congealed liquid in the jacket 47 causing a melting or change in state of a small amount of the frozen congealing liquid without raising the temperature thereof. This latent heat is then stored in the congealing liquid until the following absorption period when it is again removed and the liquid re-frozen. In this way the temperature of the evaporator is maintained at a substantially low point even during the generating period and provides refrigeration for the food compartment during that period.

I have also provided means in the form of a selective temperature regulating valve for maintaining substantially constant temperatures within the evaporator during the refrigerating period. This temperature regulating means is disclosed in the form of a valve generally indicated by the reference character Y, which valve is adapted to be opened and closed by means of a plunger 39 movable in response to the diaphragm 38, which diaphragm 38 is exposed to and influenced by the pressure within the evaporator E. The pressure within the evaporator E required to open the valve 39 by contracting the bellows 38 may be regulated by means of the spring 40 provided with a connection 41 to a regulator knob. Suppose for instance that it is desired to maintain a temperature of substantially 25° within the evaporator, then the tension of the spring 40 is adjusted by means of the regulator knob to require a pressure in the evaporator corresponding to a temperature of 25° to contract the bellows 38. As the pressure within the evaporator falls to that predetermined point, the plunger 39 will move towards the valve seat, thereby throttling the flow of refrigerant gas from the evaporator to the absorber. The throttling of the flow of gas will retard the evaporation of liquid refrigerant within the evaporator E. If the pressure within the evaporator falls below that predetermined point, then the valve will be entirely closed. On the other hand, if the pressure within the evaporator E rises above that predetermined pressure, the plunger 39 will move away from the valve seat, thereby permitting more rapid evaporation of liquid refrigerant in the evaporator E. This temperature regulating valve therefore maintains the temperature of the evaporator at substantially any desired point and is termed a selective temperature control.

It should be noted that the structure indicated generally at Y functions both as the selective temperature control and as the means for tipping the valve 36 off its seat for controlling the condensing pressure. This dual function is accomplished by the provision of the spring 39' providing a resilient connection between the plunger 39 and the lever 40' during the one operation and as a solid connection during the other operation. For example, during the refrigerating cycle when valve Y is operating as a temperature control, the plunger 39 and spring 39' move as a unit; while during the generating cycle, the high pressure is sufficient to move the plunger 39 against the tension of spring 39' to open valve 36.

In order to start and stop the generating and absorbing periods automatically, it is necessary to arrange in some way for opening and closing the gas and vapor valves. In addition to this, it is also desirable to provide suitable means for determining when these valves shall be opened and when they shall be closed; in other words, when the heating period shall commence and when the heating period shall terminate.

For automatically opening and closing the gas and vapor valve or, in other words, initiating and terminating the heating period, I have provided means responsive to the pressure within the heating and cooling system. For instance, the vapor valve 28 is controlled by a plunger 60 operated by movement of the bellows 61, which bellows is in open communication with the interior of the heating and cooling system and therefore moves in response to varying pressures therein. A rod 62 has one end connected to the movable plunger 60 and its other end pivoted to a lever 64, which lever is pivoted at 65 and carries a rod 66 connected to a valve disc or diaphragm 67 controlling the valve 68 in the gas line 69.

An upper spring 70 is connected to the lever 64 to oppose the opening of the vapor valve 28 and to give the entire system a bias tending to close the vapor valve 28 and tending to open the gas valve 68. Also connected to the lever 64 is a toggle snap-acting mechanism including a lower spring 71 connecting the main control lever 64 and a short lever 72, and a toggle link 73 connecting the short lever 72 and the main control lever 64. The function of the toggle mechanism including the lower spring 71 is to resist movement of the main control lever 64 in either direction until the accumulated pressure has reached a stated amount and then to insure complete movement from one position to the other position after the movement is started in either direction. This insures the complete opening or the complete closing of the vapor valve 28 and the gas valve 68.

Assuming that the generator-absorber GA is being heated, or, in other words, that the generating cycle is taking place, valve 28 is closed by means of the movable plunger 60 and the gas valve 68 is open, these valves being held in this position by means of the spring 70. Towards the end of the generating period after a complete charge of ammonia has been driven out of the absorbent material within the asborber, the temperature and the pressure of the heat transfer vapor within the jacket 18 surrounding the generator-absorber will rise abnormally or very rapidly, due to the fact that no more heat is being taken out from the heat transfer liquid for the purpose of driving out refrigerant from the absorbent material. When the pressure of the vapor within the heating and cooling system reaches a point where the force exerted by it is greater than the force exerted by the control spring 70 and the toggle spring 71 which tend to hold the vapor valve shut, the bellows 61 will collapse moving the plunger 62 rapidly to the left under the control of the toggle mechanism, thereby pivoting the lever 64 counter-clockwise to open the valve 28 and simultaneously to move the diaphragm 67 to a position to close the gas valve 68.

The absorption or refrigerating cycle then starts as heretofore described, because the cool heat transfer liquid contained in the condenser jacket 24 drains down around the absorber, thus cooling the absorber and lowering the pressure within the entire refrigerating system. This reduction in pressure within the ammonia system causes the liquid ammonia in the evaporator E to evaporate and produce refrigeration in the usual manner. The pressure of the heat transfer vapor within the heating and cooling system is also reduced as soon as the gas flame is shut off and the vapor valve is open. When the vapor pressure of the liquid within this heating and cooling system is reduced to a point where the forces exerted by it on the bellows 61 are so small that the force exerted in the opposite direction by the control or loading spring 70 is sufficient to overcome the resistance of the toggle mechanism, the spring 70 will close the vapor valve 28 and open the gas valve 68. In other words, the opening and closing of the valve 28 permitting the circulation of the heat transfer liquid within the heat transfer circuit, are directly controlled by the pressure within the heat transfer circuit.

While it is advisable to make use of the varying pressures within the heat transfer circuit to initiate and terminate the heating and cooling cycles, these conditions cannot be relied upon alone to determine whether the proper time has arrived for initiating one cycle and terminating the other cycle. For example, if the cooling water used for cooling the condenser is abnormally low in temperature, then the pressure within the heat transfer cycle may fall low enough to start a heating cycle before a complete charge of refrigerant has been absorbed. Also, where conditions are such that but a small amount of refrigeration is required within the evaporator, due for example to a low temperature of the surrounding atmosphere, absorption may be so slow as to cause an undue low pressure within the heating and cooling circuit. In either of these cases, what is known as short cycling may take place unless some means are provided for preventing the operation of the lever mechanism for starting a heating cycle until a full charge of refrigerant has been absorbed. To accomplish this end, the apparatus is provided with what is termed "an interlock." This interlock is indicated generally at 80 and comprises a casing 81 connected directly into and forming a part of the refrigerant line L. This casing 81 encloses a bellows 82 connected at one end to the casing and at its other end to a plunger 83. To the plunger 83 and within the bellows 82 is connected a rod 84 having its other end connected to a lever or latch 85 pivoted to the casing at 86. The exterior of the bellows 82 is exposed to refrigerant pressure and the movement of the bellows is opposed by the spring 87 secured at one end to the casing 81 and its other end to the lever 85. At the end of the lever 85, there is provided a notch 88 adapted to engage the end of lever 64 for a purpose hereinafter fully described.

Assume now that the refrigerating or absorption cycle is under way, then the pressure within the refrigerating system drops, causing the bellows 82 to expand, thereby moving lever 85 counterclockwise. Notch 88 thereby engages the end of lever 64. The parts remain in this position since, regardless of how low the pressure may drop within the generator-absorber and the condenser, the operation of the lever 64 to open gas valve 68 and close vapor valve 28 is prevented until the pressure within the refrigerating system rises above a certain predetermined point thereby moving lever 85 out of engagement with the lever 64. Under normal or ideal conditions, such a rise in pressure does not take place until a desired complete or full charge of refrigerant has been absorbed by the absorbent material, since, under such conditions the rise in pressure to the tripping point indicates that the absorbent is approaching a saturated condition.

The purpose of the diagrammatic view theretofore described is not to show the parts in detail but merely to disclose the function of the various parts. These parts are shown in detail in the figures following Fig. 1 and are described as follows.

Temperature regulator

As hereinbefore pointed out, I have provided a selective temperature regulator whereby a range of substantially constant temperatures is available to the user of this apparatus. Broadly speaking, this regulator consists of a valve located in the line between the evaporator and the condenser, the valve being automatically moved towards the open and closed positions by means of a bellows or diaphragm responsive to the pressure within the evaporator. By providing an easily adjustable spring balancing the evaporator pressure desired, the pressure within the evaporator tending to open the valve may be controlled. The temperature within the evaporator, which varies proportionally with the pressure therein, may therefore be controlled and maintained at any point within reasonable limits by adjusting the spring tension.

The details of the temperature regulator are shown in Figs. 2 to 7 inclusive. This regulator includes a casing 100, provided with a chamber 101 forming the inlet chamber, there being an opening 102 in the wall of the casing 100, connecting with the nipple 104, which in turn is connected by means of the liquid refrigerant line L with the outlet end of the condenser C. The open end of chamber 101 is closed by means of the plug 106, the plug being hermetically sealed in place by spinning over the flanges 108 formed on the edge of casing 100. Plug 106 has openings 110, and an outwardly and upwardly extending ring 112 supporting a screen or filter 114 for preventing the passage of any grit, dirt, or other foreign particles to the valve as hereinafter fully described.

The casing 100 is also provided with an inwardly extending annular portion having an opening 116, there being an upwardly extending flange 118 forming a valve seat.

Beyond the valve seat 118, the casing 100 is provided with an opening 122 in its lateral side, said opening 122 having screw threads therein receiving a nipple 126, which nipple has its outer end screw threaded for connection to the conduit L leading to the evaporator E.

The casing 100, at its end opposite the inlet end, is provided with a ring 130 screw threaded and soldered to the casing 100. To this ring 130 is hermetically secured a bellows 132, which bellows has its other end hermetically secured to a piston plunger 134, adapted to bear at one end of its movement, against the annular stop member 136 secured stationarily within the casing 100. The piston head of piston 134 is provided with a turned-in flange 137 against which is forced a valve disc 138 by the spring 140. The disc 138 cooperates with the valve seat in the usual manner.

A rod 150 extends within, and has one end connected to the bellows 132 and its other end screw threaded into a guide member 152, which guide member is screw threaded into the cap 154. Within the guide member 152 there is provided a rod member 156, one end of which is adapted to bear against the rod member 150 during one phase of operation as more fully described hereinafter. The rod member 156 passes through an opening 160 provided in the end of the cap 154 and is provided with an enlargement 162 adapted to bear, when in one extreme position, against the cap 154. A stiff spring 166 has one end bearing against the enlargement 162 and its other end bearing against the guide member 152. The rod 156 outside of the cap member 154 is provided with a slot 172 transversely arranged to the pin 174, for a purpose hereinafter described, and extends into a guide cap 176 located within the pocket 178 formed within the end plate 180. The guide cap 176 is provided with an annular shoulder 185 which acts as a stop for the rod 156 by engaging the end plate 180. Secured to the end plate 180 and the casing 100 is a closure member 182 enclosing the operating mechanism.

Figure 3:
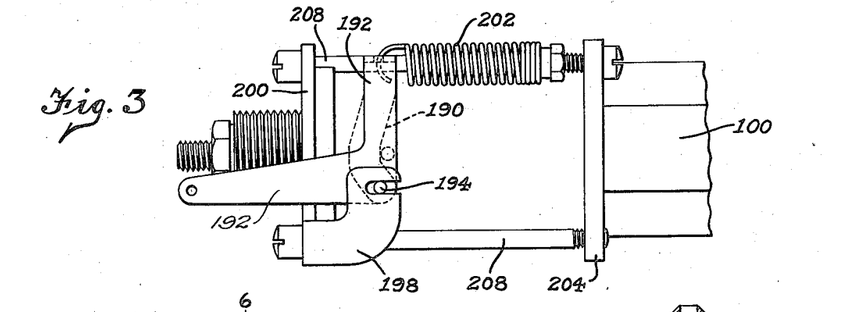
Fig. 3 is a front view of the temperature regulator valve.
Figure 4:
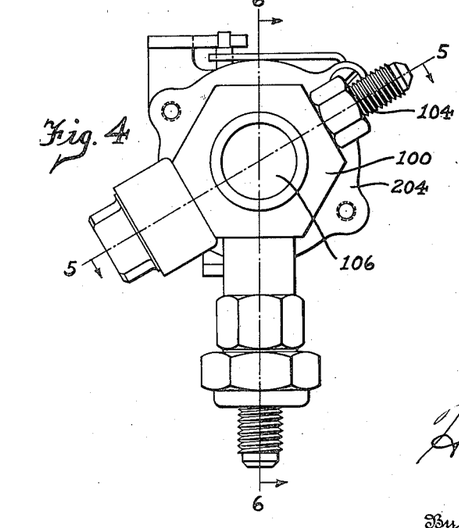
Fig. 4 is an end view of the temperature regulator valve.

As for the elements so far described, it should be understood that, by reason of the fact that the spring 166 is relatively stiff, the piston 134, the bellows 132, rod 150, guide 152, cap 154, and rod element 156, during the absorbing cycle move as a unitary structure, hereinafter for the purpose of description indicated by the reference character X. In order to regulate the pressure required to move this unitary assembly to the left as viewed in Fig. 6 and the pressure below which the unitary assembly X will move to the right, there is provided spring means balancing the said pressure. This spring tension is applied to the unitary assembly X as follows. Extending through the slot 172 and bearing against the pin 174 is an arm 190 of a U-shaped lever. This arm 190 is shown in dotted lines in Fig. 3, and the other arm of the same lever is shown in full lines at 192, pivoted on the pin 194 carried by and transversely arranged to the depending arms 196 of the cover plate 200. Outside of the casing 100 a spring 202, having its fixed end secured to the ring 204 secured to the outside of the casing 100, has its movable end connected to the horizontal yoke portion of the U-shaped lever as indicated in Fig. 3.

The end plate 180 and the closure 182 are clamped between the cover plate 200 and the ring 204 by means of the bolts 208.

The above described temperature regulating valve operates substantially as follows. When the generator-absorber is cooled, the pressure within the evaporator and likewise within the entire system drops. Assuming the temperature regulator is set to maintain a temperature of 25° F. within the evaporator, then when the pressure within the evaporator falls to a pressure corresponding to 25° F. the spring tension of spring 202 forces the unitary assembly X including the piston head 134 towards the valve seat, thereby restricting the flow of refrigerant gas from the evaporator to the generator-absorber. Restricting the flow of refrigerant gas obviously reduces the evaporation within the evaporator and tends to retard the lowering of the temperature. If the temperature falls below 25° F. then the low pressure within the evaporator permits the valve to close entirely. If, on the other hand, the temperature, and consequently the pressure, increases, then the unitary assembly X moves to the left as viewed in Fig. 6 permitting the passage of more refrigerant and consequently permitting the evaporation of more liquid refrigerant.

It should be noted that in actual operation, the lever 192 is connected by a spring 40 and cable means to a handle, not shown, conveniently arranged within easy access whereby the user may by the manipulation of the handle vary the pressure, and consequently the temperature, that will be maintained within the evaporator.

In order that the valve 138 may also be used as a service valve, there is provided an Allen set screw 220 threaded into the cap 180 at the opposite end of the cylinder which when moved inwardly will engage the guide member 176 to move the entire assembly X toward the closed end of the cylinder so that the valve disc 138 will be caused to tightly engage its seat 116 to prevent any liquid from passing through the temperature regulator valve. This, at the same time, will cause the valve 215 to be closed. In order to hold the set screw 220 in position, there is provided a lock nut 221. Thus, by providing this set screw 220, the refrigerant conduit may be shut off at this point for repairing or inspecting a portion of the system.

In order to protect the bellows 132 and the springs and other mechanism of the temperature regulator, I provide a safety blow-out cap 225 (see Fig. 5) which is in communication with the space between the head of the piston 134 and the valve seat 118. The blow-out cap 225 is mounted within a plug 226 which is plugged into the wall of the casing 100. The plug 226 is provided with an opening 227 which leads from the piston chamber to a blow-out chamber 228 which contains the blow-out cap 225. The blow-out chamber 228 has a side wall shaped like the frustum of a cone which forms a seat for the blow-out cap 225. The blow-out cap is provided with a dished center portion and a frusto-conical flange portion. This frusto-conical flange portion is held tightly upon its seat by a frusto-conical shaped wedge member 229 held in place by a threaded plug 230 which is threaded into the outer end of the plug 226. The wedge member 229 is provided with an aperture and passages therethrough which lead to a threaded outlet 231 provided in the threaded plug 230.

Figure 5:
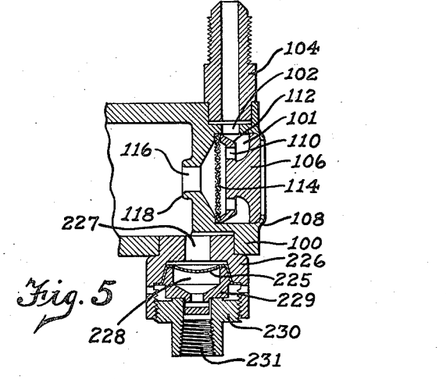
Fig. 5 is a fragmentary sectional view of the temperature regulator valve taken on the line 5—5 of Fig. 4.

Thus, if the pressure within the piston chamber should become dangerously high because of some failure of the mechanism for any reason whatsoever, the blow-out cap 225 will burst and permit the refrigerant to escape through the blow-out chamber 228 and the threaded outlet 231.

*Means for preventing the flow of heat into the evaporator during the generating period*

As pointed out in the discussion of the diagrammatic view shown in Fig. 1, there is provided means for preventing the flow of large quantities of heat into the evaporator during the generating cycle by preventing condensation of ammonia within the evaporator. This means consists of a valve so constructed and arranged that a pressure in the condenser considerably greater than the minimum condensing pressure, is required before the valve will open. Therefore, before the valve is open, the refrigerant driven into the condenser from the generator-absorber must be in liquid form and must be cooled by the water flowing in heat exchange relation with the condenser substantially to the temperature of the water, before the passage of such liquid to the evaporator is permitted. For the purpose of convenience, this valve means has been incorporated with the temperature regulating valve. For instance, referring to Fig. 6, the nipple 126 connecting with the outlet from the temperature regulating valve is provided with a guide bushing 210 having an opening 212.

Figure 6:
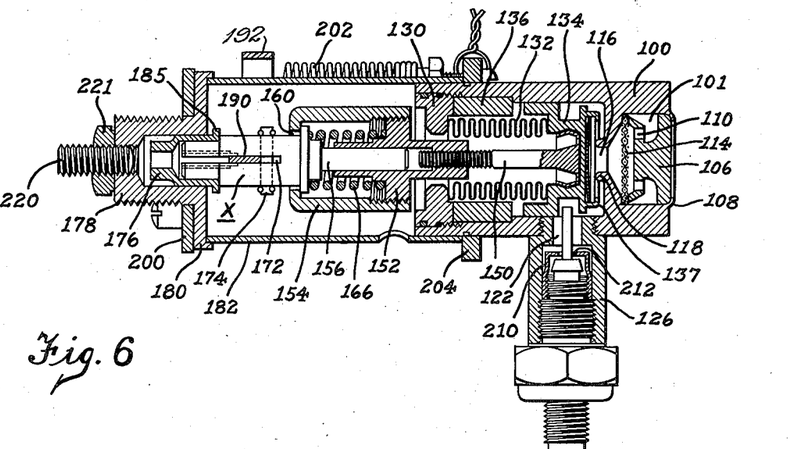
Fig. 6 is a sectional view of the temperature regulator valve with the valves in closed position taken on the line 6—6 of Fig. 4.

The guide bushing 210 is held in place by a threaded connection 213 which provides a connection between the temperature regulator and the tube leading to the evaporator. This threaded connection also carries a valve seat 214 within the guide bushing 210. Upon this valve seat 214 is seated a liquid valve 215 which is shaped somewhat like a poppet valve. This valve 215 has its head adapted to sit upon the seat 214 and has its stem extending through the opening 212 in the guide bushing and also through the opening 122 in the nipple 126 and has its end portion extending into a groove 217 which surrounds the head of the piston 134 within the cylindrical body of the temperature regulator. The valve 215 is opened and closed by moving the piston 134 within the casing 100 so that a side of the groove 217 will engage the end of the stem to tilt the valve upon its seat.

Figure 7:
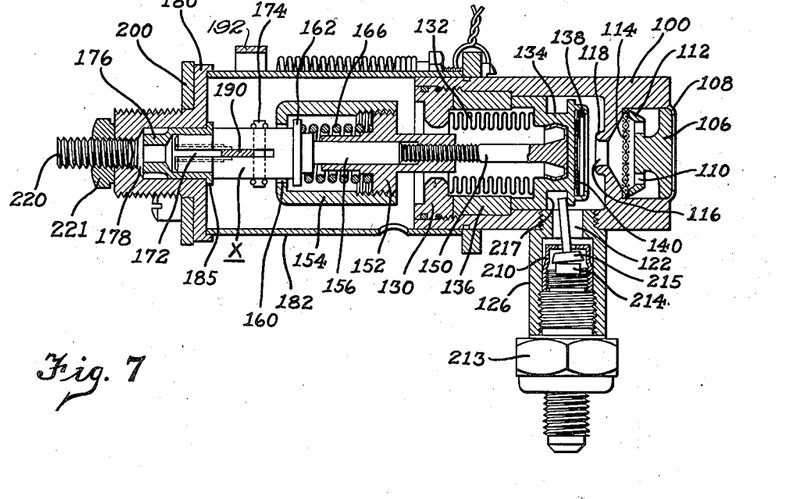
Fig. 7 is another sectional view along the line 6—6 of Fig. 4 showing the temperature regulator valve in open position.

When the generator-absorber GA is heated, refrigerant will be forced through the condenser 14 and through the conduit L into the piston chamber of the temperature regulator. The valve 215 will remain in closed position at this time. As the pressure increases, the unitary assembly X will be moved toward the end plate 180 until the shoulder 185 upon the guide cap 176 engages the end plate 180. The annular shoulder 185 upon the guide cap 176 is so located that it will engage the end plate 180 before the stem of the valve 215 is engaged by the side of the groove 217 upon the piston head 134. After this engagement, the piston head 134 is no longer under the control of the temperature control spring 202 and the manual temperature regulating control, but is now under the control of the stiff spring 166. Consequently, the pressure upon the piston 134 must be sufficiently high to move the piston away from the head end of the cylinder or casing 100 a sufficient distance to first move the shoulder 185 against its stop, namely the end plate 180 and to compress the stiff spring 166 in order to tilt the valve 215 upon its seat 214 as shown in Fig. 7. A pressure sufficiently high to do this is above the pressure required to liquefy the refrigerant in the condenser at condenser temperatures. The tilting of the valve 215 will permit the refrigerant thus liquefied in the condenser 14 to pass into the evaporator E when the predetermined pressure is reached. In this way the flow of liquid refrigerant to the evaporator E is so controlled by the spring 166, the piston 134, and the valve 215, that pressure in excess of that required to liquefy the refrigerant in the condenser is maintained in the condenser during the generating period. This valve 215 therefore prevents the condensation within the evaporator of any hot refrigerant vapor from the generator-absorber.

*Cycling controls*

The means for opening and closing the gas valve and the vapor valve, comprises essentially a set of levers normally biased by spring means to hold the vapor valve closed and the gas valve open, but so connected into the system that an increase in pressure within the vapor heating and cooling system above a predetermined amount will open the vapor valve and close the gas valve to initiate the absorbing or refrigerating period and to simultaneously terminate the heating period.

Specifically, a casing 400 (see Fig. 8) having an opening 401 provided with the annular flange 402 forming a valve seat, is screw threaded into casing 403 forming the upper portion of the vapor heating and cooling circuit. Within the casing 400 is screw threaded a ring member 404 to which is hermetically secured a diaphragm or bellows 405. The bellows 405 has its other end attached to the movable plunger or vapor valve 406, which plunger has an inturned annular flange 407 on its outer side, against which the valve disc 408 is adapted to be forced by the spring 409. The inturned flange 407 in fact forms a pocket within which is housed both the valve disc 408 and the spring 409. The casing 400 is provided with an outlet 413 which corresponds to the vapor conduit 22 and connects to the jacket 18 of the generator-absorber.

Figures 8, 14:
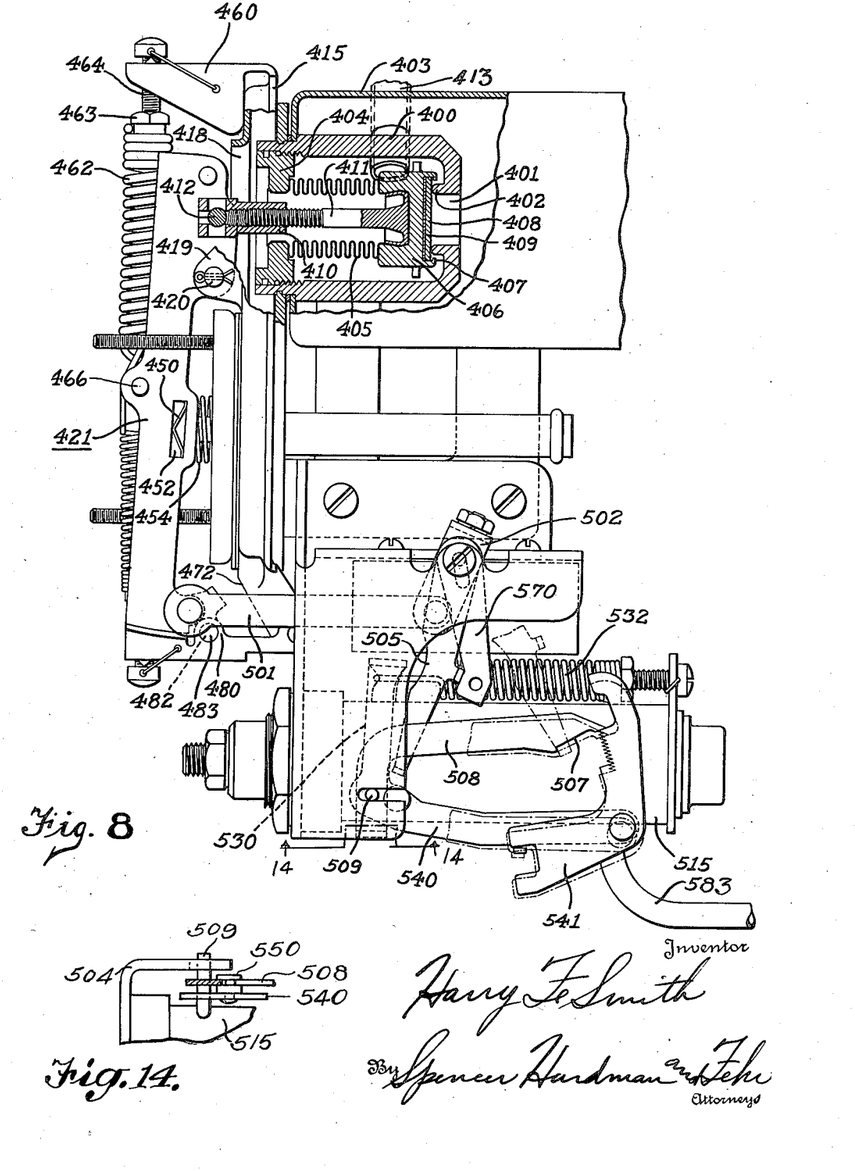
Fig. 8 is a view in elevation of the cycling controls.
Fig. 14 is a sectional view showing the grooved button 550.
Figure 9:
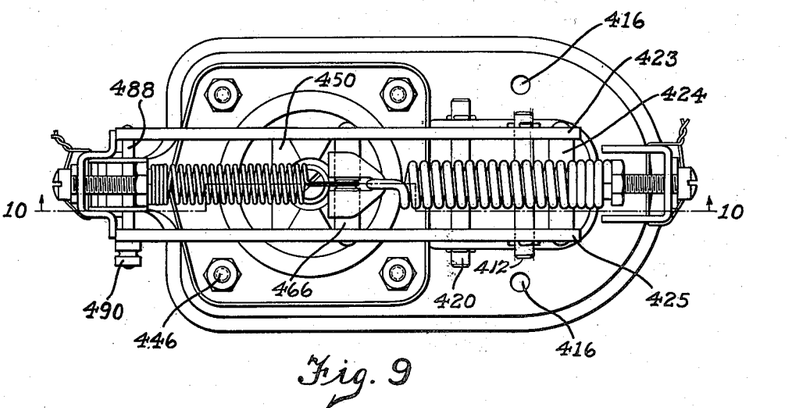
Fig. 9 is a front view of the cycling control.

A rod 411 attached to the plunger 406, extends outwardly through the central opening in the ring member 404 and has its outer end screw threaded into a socket 410 through which socket passes a pin 412.

A standard 415 provided with holes 416 for attaching screws, is provided at its upper end as viewed in Fig. 8 with an opening 418 substantially in alignment with the outer end of the casing 400. On opposite sides of the opening 418 the standard has ears 419, the ears having aligned openings through which passes a pin 420 shown as held in position by means of cotter pins. A lever 421, formed by the two arms 423 and 425, spaced apart but connected together by cross bars 424 so as to act as a single unitary lever, is pivoted on the pin 420, the pin 420 passing through aligned openings formed in the arms 423 and 425. On the upper side of pin 420 as viewed in Fig. 8, the lever has aligned openings 422 in which fits the pin 412, thereby securing the rod 411 to the lever 421.

Figure 10:
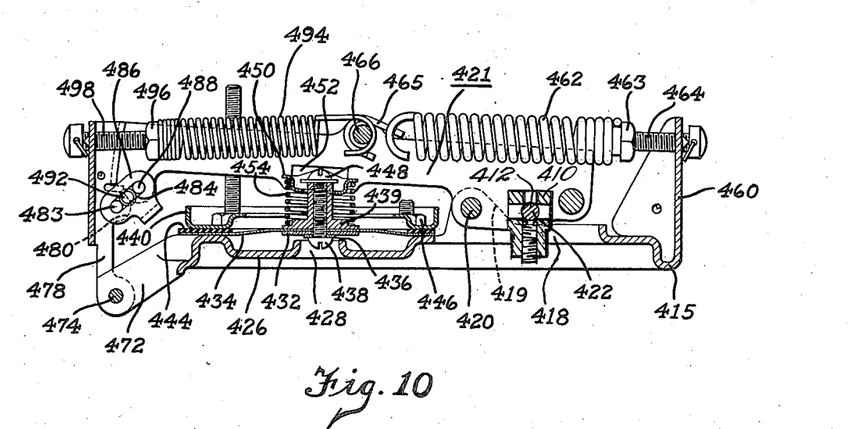
Fig. 10 is a sectional view on the line 10—10 of Fig. 9.

To the left of the opening 418 as viewed in Fig. 10 the standard 415 is provided with a depressed portion 426 having an inlet opening 428 and an outlet opening (not shown) for fuel gas. The inlet 428 is controlled by a valve formed by a treated leather disc 432 carried by and secured to an impregnated fabric diaphragm 434 by means of a washer 436 and a screw 438 extending through the washer 436 and the diaphragm 434 and screw threaded into the metal bearing member 439 on the opposite side of the diaphragm. The diaphragm 434 is held in position by means of the clamping piece 440 securely fastened to the standard with the diaphragm 434 and the gasket 444 therebetween by means of bolts 446. On the end of the bearing member 439, there is secured by a screw 448 a cross member 450 having its ends fitting into the openings 452 formed in the lever 421 intermediate the ends of the lever. A spring 454 surrounding the bearing member 439 has one end bearing against the cross member 450 and the other end against the enlarged portion of the bearing member 439. Thus, when the lever 421 is forced outwardly by the rod 411 due to the contraction of the bellows 405, the lever pivots about its pivot point and closes the gas valve 432.

At one end, the upper end as viewed in Fig. 8 and at the right as viewed in Fig. 10, the standard 415 is provided with an outwardly extending lug 460. A spring 462 has one end secured to a nut 463 into which is screw threaded a bolt 464 passing through the lug 460. At its other end the spring 462 is secured to a metal piece 465 surrounding and moving freely on a pin 466 extending between the two arms of the lever 421.

At its other end, the standard 415 has an inwardly directed ear 472 carrying a pin 474, the pin 474 having pivoted thereon a short two armed lever 478. Intermediate the ends of this short lever 478 are two ears 480 having aligned openings 482 through which openings passes the pin 483. Pin 483 extends through aligned slots 484 formed in the short bifurcated toggle lever 486. This toggle lever 486 is likewise connected to the main lever 421 by means of a pin 488 extending through the same slots 484 and provided with an extension 490 for connection to the inter-lock as more fully described hereinafter. Also, in the aligned slots 484 and positioned between the pins 483 and 488 is a pin or roller 492 acting as a roller bearing for the two pins.

A toggle tension spring 494 is connected at one end with a nut 496 through which passes a screw 498, which screw also passes through the short two armed lever 478. The other end of spring 494 is secured to the pin or connecting bar 466.

The toggle tension spring 494 provides an upward pull upon the short lever 478 which in turn bears upon the toggle lever 486 so as to urge it to assume either of two extreme angular positions depending upon whichever side of the aligned dead center position that the toggle lever 486 happens to be. This provides a toggle snap acting mechanism which resists the movement of the main lever 421 until a sufficient force is exerted thereon to begin the movement from one of the extreme positions to the other. In a toggle mechanism of this type, the initial force necessary to move the lever from its initial position is greater than the force required to complete the movement. It will thus be understood that a movement which is begun by a sufficient initial force will move to completion. This insures that the main lever will be normally held in either of the two extreme positions and that the vapor valve 406 will normally be held in either tightly closed or fully open position while the gas valve 432 will normally be held in either fully open or tightly closed position under the tension of the toggle spring 494.

Interlock

The cycling control is connected to the interlock by a link 501 as shown in Fig. 8. This link is connected at one end to an inverted U-shaped lever 502 which is pivoted upon a pair of pins 503 which are threaded into a supporting bracket 504 of irregular shape. The inverted U-shaped lever 502 has a long arm 505 extending downwardly. This arm has a foot 506 at its lower end which is adapted to engage a notch 507 upon the interlocking arm 508 having a U-shaped lower end which is pivoted upon a pin 509 which rests in a slot 544 in the supporting bracket 504 and extends through the lower portion of a cylinder 515. This pin 509 has an inverted U-shaped lever 530 mounted thereon, one leg of which extends outside the cylinder 515 while the other leg 530' extends through a slot 547 into the cylinder. This leg 530' is held by the tension spring 532 against a pin 543 carried by a slide 510 which fits into a bushing 511 which in turn is slidably supported within a cap member 512. The bushing 511 has an annular flange 537 which is adapted to abut the cap member 512 and the shoulder 538 upon the slide member 510 to act as a stop and limit the movement of the slide. The other end of the slide member 510 has a rod 513 threaded therein which in turn has its head connected to a piston 514 which is mounted in a cylinder 515. The piston 514 carries a valve disc 516 upon its face which is retained by a bent over flange 517 which projects from the face of the piston. A four armed spider type spring 518 is provided between the face of the piston and the valve disc 517 so as to provide a resilient mounting for the valve disc. The valve disc 516 cooperates with the face of a boss 519 which forms a valve seat upon the end wall of the cylinder 515. A drilled passage 521 extends through the boss and the end wall of the cylinder 515. This drilled passage 521 connects with a passage 522 which in turn connects to the refrigerant conduit 523 leading to the condenser. A second drilled passage 582 connects the piston chamber within the cylinder 515 with the conduit 583 which leads to the evaporator. In this way the piston 514 is subject to the pressure of the refrigerant within the conduit 583 but when the piston is moved towards its end wall, the valve 516 is pressed against the face of the boss 519 to close the drilled passage 521.

Figures 12, 13:
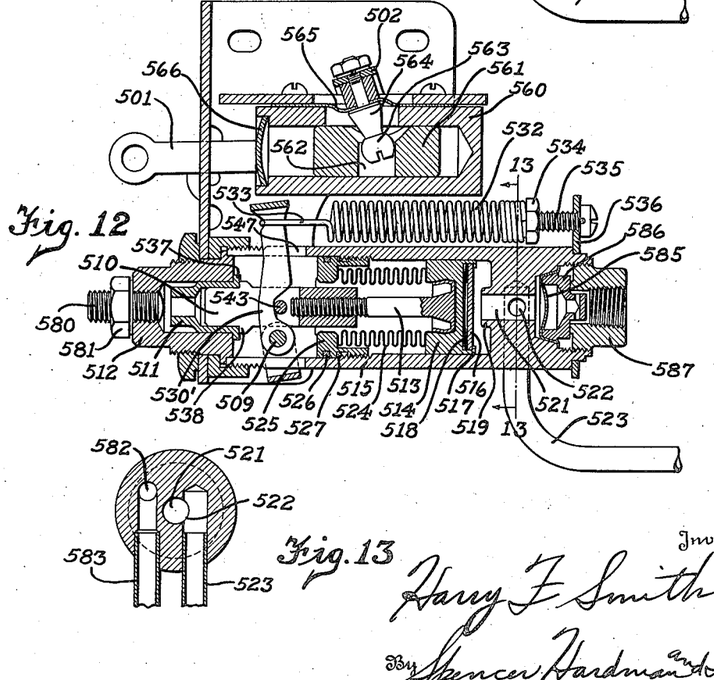
Fig. 12 is a sectional view of the interlock.
Fig. 13 is a sectional view along the line 13—13 of Fig. 12.

The piston 514 is sealed by a flexible metal bellows 524 which has its closed end fitted between the head of the rod 513 and the piston 514. The open end of the flexible metal bellows 524 is connected to and sealed to a ring 525 which is threaded into the cylinder 515 and soldered thereto. An asbestos ring 526 is provided for preventing the soldering flux from entering the bellows chamber.

The pin 543 which is mounted in the slide member 510, bears against the legs 530' of the inverted U-shaped lever 530 which is pivoted upon a pin 509. The lever 530 is maintained in engagement with the pin 543 by a tension coil spring 532 which has one end 533 hooked over one end of the lever 530 and which has the other end wrapped around and fastened to a nut 534 which is threaded upon a screw 535 which extends through a plate 536 mounted on the closed end of the cylinder 515. At the side of the cylinder 515 the U-shaped lever 530 has an arm 540 extending therefrom upon which is a pawl 541 which is pivotally mounted thereon by means of the pin 542.

The arm 540 has a button 550 which has a groove thereon engaging the interlocking arm 508 to maintain the arm 508 in proper lateral relation to the arm 540 so that the end of the interlocking arm 508 will properly engage the pawl 541. The pawl 541 has a forked inner end which surrounds a projection 551 on the arm 540 so as to permit only a limited movement of the pawl 541. The upper end of the pawl 541 has an edge 552 thereon beneath which is a primary shoulder 553 and a secondary shoulder 554. Between the primary shoulder and the secondary shoulder are a plurality of fine ratchet teeth. These ratchet teeth are adapted to engage the chisel-shaped end portion of the interlocking arm 508 when the arm 508 is in certain positions.

In order to prevent sudden rapid movements of the control mechanism which would have a harmful effect, I provide a dash pot mechanism comprising a cylinder 560 closed by means of a welch plug 566 and containing a loosely fitting piston 561. The piston 561 is provided with an aperture 562 therein which receives a ball-shaped end 563 of a stud 564 fastened to the yoke of the inverted U-shaped lever 502 by a nut threaded upon the top of the stud 564. A fabric diaphragm 565 is provided for sealing the opening through which the stud 564 extends through the cylinder wall. The cylinder 560 is filled with oil of a suitable viscosity which limits the rate of movement of the piston 561 and so controls the rate of movement of the inverted U-shaped lever 502 and the interlock link 501, and in this way controls the rate of movement of the entire control mechanism including the toggle mechanism.

At the front or open end of the cylinder 515 I have provided an Allen set screw 580 which is threaded into the cap 512. This is used to engage the cap 511 at the end of the slide bar 510 to move the entire assembly including the slide 510, the rod 513, the piston 514, and the valve disc 516 rearwardly into engagement with the valve seat 519 at the closed end of the cylinder 514 to shut off the evaporator from the condenser and the generator-absorber. The set screw 580 is provided with a lock nut 581. In this way the interlocking mechanism may also be used as a service valve to close the refrigerant circuit at this point.

The closed end of the cylinder has a passage 582 and conduit 583 which lead to the evaporator. At the closed end of the cylinder 515 there is also provided a rupture disc 585 of a suitable metallic material which is located at one end of the drilled passage 521. The rupture disc 585 is held in place by a ring 586 clamped in place by means of a plug 587. Should the pressure within the generator become excessively high, this rupture disc will burst and allow the refrigerant to escape, thereby preventing injury to the refrigerating system and preventing an explosion.

The generating cycle is stopped and the refrigerating or absorbing cycle is begun by pressure on the bellows 405 in the front end of the condenser sufficient to overcome the tension of the main control spring 462 and the toggle snap acting mechanism, which pressure causes the lever 421 to turn counterclockwise about its pivot 420 to tightly close the gas valve 428, to fully open the vapor valve 408, and also to move the link 501 of the interlock rearwardly all under the control of the toggle snap acting mechanism and the oil dash pot control mechanism. This rotates the inverted U-shaped lever 502 of the interlock in a counterclockwise direction about its pivot pins 503, thus moving the lower end of the arm 505 rearwardly so that the foot 506 at its lower end will engage the shoulder 556 forming one side of the notch 507 on the bottom portion of the interlocking arm 508, thereby causing the lever 421 to be held in its rearward position while the vapor valve is held open and the gas valve is held tightly closed.

When the control mechanism thus moves to open the vapor valve and to close the gas valve to begin the absorption cycle, the volatile liquid in the vapor heating and cooling system will begin to cool the generator-absorber. As long as the pressure within the condenser and absorber is above the pressure within the cooling or chilling unit, no refrigerant will be drawn from the cooling unit. The cooling of the absorber will cause it to begin to absorb refrigerant and to lower the pressure within the generator-absorber, the condenser, and the refrigerant conduits between the temperature regulating valve and the generator-absorber. The vapor pressure within the cooling unit is maintained substantially constant at this time because of the influence of the congealing solution surrounding the liquid reservoir of the cooling unit.

When the generator-absorber has been cooled a sufficient length of time to absorb a sufficient amount of refrigerant within the generator-absorber portion of the refrigerant circuit to lower the pressure in that portion below the pressure within the cooling unit, refrigerant vapor from the cooling unit will begin to flow from the cooling unit through the temperature regulating valve to the generator-absorber. Under normal evaporating conditions within the evaporator evaporating only a normal amount of refrigerant within the evaporator, the generator-absorber at this time will have greater capacity to absorb refrigeration than the amount of refrigerant supplied by the cooling unit so that the pressure in the generator-absorber portion of the refrigerant circuit will fall considerably below the pressure of the evaporator side of the temperature regulating valve which will be maintained constant by the temperature regulating valve. This reduction in pressure will permit the piston 514 of the interlock mechanism to be moved toward the head end of the cylinder 515 under the tension of the spring 532. This causes the arm 540 carrying the pawl 541 normally to move to its lowermost position, as shown in Fig. 8 in dotted lines, so that the end of the interlocking arm 508 is above the primary shoulder 553. This in turn permits the interlocking arm to rest upon the foot 506 of the arm 505 to engage the shoulder 556 forming one side of the notch 507 at the end of the interlocking arm 508.

After the absorption or refrigerating cycle has begun, the pressure in the volatile liquid circuit is reduced by the cooling effect of the condensers, thereby reducing the pressure on the bellows 405, and this, together with the main control spring 462, tends to urge the control lever 421 into the position for the generating cycle. The interlock link 501, however, prevents this movement of the control lever 421 because it is held in its retracted position by the interlocking arm 508 and the arm 505 upon the inverted U-shaped lever 502. After the interlocking arm 508 engages the foot 506 at the lower end of the arm 505, the termination of the absorption cycle and the initiation of the new generating cycle is under the control of the refrigerant pressure in the generator-absorber.

The refrigerant pressure upon the generator-absorber side of the temperature regulating valve is governed by the amount of refrigerant flowing through this temperature regulating valve from the cooling unit and by the rate at which the generator-absorber can absorb the refrigerant. If because of low temperature within the refrigerator cabinet, and a lack of demand for refrigeration, no refrigerant flows through the temperature regulating valve, the pressure upon the generator-absorber side of the valve will fall to an extremely low point. If there should be a very great demand for refrigeration upon the cooling unit, such as when the food compartment door is opened or when several trays of water are placed within the cooling unit to be frozen, a relatively great amount of refrigerant vapor will pass through the temperature regulating valve from the cooling unit and this may at that time exceed the rate at which the generator-absorber can absorb the refrigerant and therefore this condition will cause the refrigerant pressure upon the generator-absorber side of the valve to rise. Such a rise in pressure may be either temporary or permanent depending upon the conditions within the food compartment and the cooling unit.

Should the refrigerant pressure for any reason rise to a sufficient predetermined amount, this pressure will cause the piston 514 to move away from the end of the cylinder 515 a sufficient amount to pivot the arm 540 counterclockwise about the pivot pin 509, thus raising the pawl 541 and causing the shoulder 553 upon the pawl 541 to engage the chisel-shaped end of the interlocking arm 508. As the pawl 541 continues its upward movement, on account of the rising pressure, it lifts the interlocking arm 508 and its shoulder 556 from engagement with the foot 506 on the arm 505 so that the arm 505 and the interlocking link 501 are permitted to move forwardly under the tension of the spring 462. This releases the control mechanism so that the pressure within the vapor heating and cooling system acting upon the plunger 406 causes the gas valve to open and the vapor valve to close so that a new generating cycle is begun.

As the generator-absorber absorbs more and more refrigerant, its maximum rate of absorption decreases slowly and as the absorbent approaches its saturation point, this capacity of absorption begins to become very low, consequently there is a point reached at which the absorbent is no longer able to absorb a normal quantity of refrigerant passing through the temperature regulating valve at the same rate at which it is generated within the evaporator, thereby causing the pressure within the generator-absorber to rise and to continue to rise and finally cause sufficient pressure to be exerted upon the piston 514 to disengage the interlock as above described.

In normal operation, the refrigerant pressure drops to a very low point at the beginning of the absorption cycle, causing the arm 540 and the pawl 541 to move to a very low position, such as is indicated in dotted lines in Fig. 8. However, under unusual circumstances, particularly upon initial operation of the apparatus, the refrigerant pressure sometimes fails to drop the customary amount during the initial operation of the absorption cycle. Under such conditions, the pawl 541 will not move to such a low position but will engage the chisel-shaped end of the interlocking arm 508 at some point below the shoulder 553, such as one of the ratchet teeth, or the lower shoulder 554. The ratchet teeth will permit the lowering of the pawl 541 and the arm 540 upon any drop in pressure without disengaging the interlocking arm 508, but any substantial rise in pressure will cause the particular tooth engaged to lift the interlocking arm 508 from engagement with the foot 506 upon the lower end of the arm 505.

Thus, any absorption capacity and its consequent refrigerating effect, even though at a higher pressure, will be taken advantage of, but a substantial increase in pressure will terminate the absorption cycle. The refrigerant pressure may even be so high as to cause the arm 508 to be engaged by the lower shoulder 554 upon the pawl 541, and on occasions of extremely high pressure, during the absorption cycle, and at all times during the generating cycle, when the pressure is always high, the movement of the piston 514 is stopped by the angular flange 537 coming into contact with the cap member 512, thus preventing the movement of the interlocking mechanism beyond its operating range.

It will therefore be seen that under normal conditions this interlock so controls the beginning of a new generating cycle that such a generating cycle is not begun until the absorber approaches its saturation point. However, under unusual conditions of refrigerating demand the supply of refrigerant vapor from the cooling unit may be so great as to cause the capacity of the generator-absorber to be exceeded even when it is still considerably removed from a saturated condition and the resultant rise of refrigerant pressure may at times become great enough to cause the interlocking mechanism to release the main control lever and initiate a new generating cycle before the generator-absorber becomes saturated.

Figure 11:
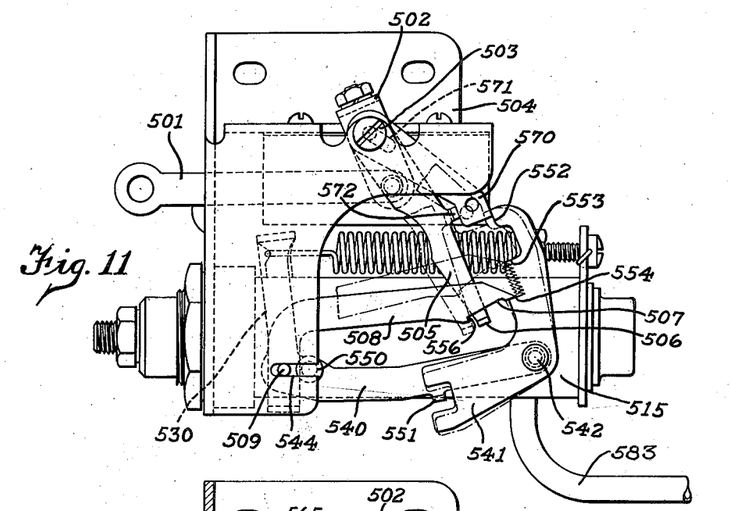
Fig. 11 is a view in elevation of the interlock.

In order to retract the pawl 541 and to move it out of the path of the arm 508 when the control mechanism is changed to the rearward position for the absorption cycle, there is provided a loosely mounted arm 570 having a slot 571 at its upper end through which extends one of the threaded pivot pins 503. The arm 570 is engaged by the foot 572 on the arm 505 so that when the interlock link 501 is moved rearwardly, the lower end of the arm 570 will engage the head end 552 of the pawl 541 and move it to retracted position so that the chisel-shaped end of the interlocking arm 508 will not engage the primary shoulder 553 or any of the ratchet teeth therebelow, thereby permitting the arm 508 to fall so that the notch 507 engages the foot 506 on the arm 505. When this is done, the inverted U-shaped lever 502 with its arm 505 is permitted to move clockwise and travel from its extreme position as shown in Fig. 11 until it engages the shoulder 556 at one end of the notch 507. This also carries the link 570 with it and removes it from engagement with the pawl 541, so that the pawl 541 and particularly the ratchet teeth or the primary shoulder 553 are then allowed to engage the chisel-shaped interlocking arm 508. The slot 571 in the arm 570 permits the upward movement of the arm 570 should it be engaged by the head 552 of the pawl 541. The position of the arm 540 of course depends upon the pressure within the refrigerating system.

It will therefore be seen that I have provided an improved control means for an intermittent absorption refrigerating system which prevents short cycling and condensation in the evaporator, and provides better operation.

While the form of embodiment of the invention as herein disclosed, constitutes a preferred form, it is to be understood that other forms might be adopted, all coming within the scope of the claims which follow.

What is claimed is as follows:

1. Absorption refrigerating apparatus including a generator-absorber containing a solid absorbent and an evaporator communicating with the generator-absorber, means for heating the generator-absorber, automatic means for initiating said heating means, valve means for controlling the flow of refrigerant from the evaporator, and means for positively preventing the operation of said automatic means until after the rate of absorption within the generator-absorber becomes less than the rate at which refrigerant from the evaporator passes through said valve means, when the apparatus is charged with a quantity of refrigerant substantially greater than the amount which can ever be absorbed by the generator-absorber during normal operation.

2. Absorption refrigerating apparatus including a generator-absorber and an evaporator communicating with the generator-absorber, means including a volatile liquid for heating the generator-absorber, means dependent upon the pressure of said volatile liquid for initiating the heating of the generator-absorber, and means for suspending the operation of said dependent means to delay the heating of the generator-absorber.

3. Absorption refrigerating apparatus including a generator-absorber, a condenser, and an evaporator in communication therewith, means for intermittently heating and cooling the generator-absorber to provide generating and absorbing cycles, and means responsive to the combined influence of the pressure within the evaporator and the atmospheric pressure for regulating the temperature of the evaporator.

4. Absorption refrigerating apparatus including a generator-absorber, a condenser, and an evaporator in communication therewith, means for intermittently heating and cooling the generator-absorber to provide generating and absorbing cycles, and means responsive to the combined influence of the refrigerant pressure within the condenser and the atmospheric pressure for regulating condensing temperature.

5. Absorption refrigerating apparatus including a generator-absorber, a condenser, and an evaporator in communication therewith, means for intermittently heating and cooling the generator-absorber to provide generating and absorbing cycles, and means responsive to the combined influence of the pressure within the evaporator and the atmospheric pressure for regulating the temperature of the evaporator, and to the combined influence of the pressure within the condenser and the atmospheric pressure for regulating the condensing temperature.

6. Absorption refrigerating apparatus including a generator-absorber, a condenser, and an evaporator in communication therewith, means for intermittently heating and cooling the generator-absorber to provide generating and absorbing cycles, and a single pressure responsive means for maintaining the evaporator at a predetermined temperature during the cooling period and for maintaining a predetermined refrigerant pressure within the condenser during the heating period.

7. Absorption refrigerating apparatus including a generator absorber, a condenser and an evaporator in communication with the generator absorber, means for intermittently heating and cooling the generator absorber to provide generating and absorbing cycles, a throttling means located between the generator-absorber and the evaporator for throttling the flow of refrigerant between the evaporator and the absorber, and means responsive to the combined influence of the refrigerant pressure within the evaporator and atmospheric pressure for controlling said throttling means to regulate the temperature of the evaporator during the cooling period.

8. Absorption refrigerating apparatus including a generator absorber, a condenser and an evaporator in communication with the generator absorber, means for intermittently heating and cooling the generator absorber to provide generating and absorbing cycles, a throttling means located between the condenser and the evaporator for throttling the flow of refrigerant between the absorber and the evaporator, and means responsive to the combined influence of the refrigerant pressure within the condenser and atmospheric pressure for controlling the throttling means to regulate the pressure within the condenser during the heating period.

9. An intermittent absorption refrigerating apparatus including a generator-absorber and an evaporator communicating with the generator-absorber, means including a volatile liquid circuit containing a volatile liquid and a fuel burner for heating the generator-absorber, valve means for controlling the supply of fuel to the burner, valve means for controlling the circulation within said volatile liquid circuit, a pressure responsive means dependent upon the pressure of said volatile liquid for controlling both said valve means to start the heating period of the generator-absorber and for closing the valve means to terminate the heating period of the generator-absorber, said valve means and said pressure responsive means being operatively connected by positive mechanical means.

10. Absorption refrigerating apparatus including generating and absorbing means and an evaporator communicating with said means, said evaporator being provided with a hold-over solution, means for cooling said first mentioned means for absorbing refrigerant from the evaporator, and means for terminating the cooling and beginning the heating of said first mentioned means before all of the liquid refrigerant within the evaporator is evaporated and before any portion of the hold-over capacity of the evaporator is used.

11. Absorption refrigerating apparatus including an absorber and an evaporator in restricted communication with the absorber, means for cooling the absorber to provide an absorption cycle, and means for terminating the cooling of said absorber approximately when the rate of absorption within the absorber portion of the apparatus becomes less than the rate at which refrigerant is discharged from the evaporator, when the apparatus is charged with a quantity of refrigerant substantially greater than the amount which can ever be absorbed by the absorber during normal operation.

12. Absorption refrigerating apparatus including an absorber and an evaporator in restricted communication with the absorber, means for cooling the absorber to provide an absorption cycle, automatic means for terminating the cooling of the absorber, and means for positively preventing the operation of said automatic means until the pressure within the absorber during the absorption cycle rises above a predetermined pressure, when the apparatus is charged with a quantity of refrigerant substantially greater than the amount which can ever be absorbed by the absorber during normal operation.

13. Absorption refrigerating apparatus including an absorber and an evaporator in restricted communication with the absorber, means for cooling the absorber to provide an absorption cycle, means for controlling the flow of refrigerant from the evaporator to the absorber for maintaining the evaporator and absorber at different pressures, and means for terminating the cooling of the absorber when the pressure within the absorber during the absorption cycle rises above a predetermined pressure, when the apparatus is charged with a quantity of refrigerant substantially greater than the amount which can ever be absorbed by the absorber during normal operation.

14. An intermittent absorption refrigerating apparatus including a generator-absorber and an evaporator communicating with the generator-absorber, means including a volatile liquid circuit containing a volatile liquid and heating means for heating the generator-absorber, valve means for controlling the circulation within the volatile liquid circuit, pressure responsive means dependent upon the pressure of said volatile liquid for controlling said heating means and said valve means, and means responsive to the pressure of the refrigerant within the generator-absorber for delaying the operation of said pressure responsive means to delay the heating of the generator-absorber and the operation of said valve means to prolong the absorption.

15. Absorption refrigerating apparatus including a generator-absorber containing a solid absorbent and an evaporator communicating with the generator-absorber, means for heating the generator-absorber, automatic means for initiating said heating means, valve means for controlling the flow of refrigerant from the evaporator, and means for preventing the operation of said automatic means until the refrigerant pressure within the generator-absorber rises above a predetermined pressure, when the apparatus is charged with a quantity of refrigerant substantially greater than the amount which can ever be absorbed by the generator-absorber during normal operation.

16. Refrigerating apparatus including means to generate a refrigerant from and to absorb a refrigerant in an absorbent, means for heating said absorbent during the generating period and cooling said absorbent during the absorption period comprising a closed circuit for circulating a second volatile liquid in heat exchange relation with the absorbent, means for heating and cooling said second volatile liquid, valve means in said closed circuit, and a diaphragm means forming a portion of the wall surface of said closed circuit, said diaphragm means being directly connected to said valve means and being responsive to the pressure of said volatile refrigerant in said first mentioned means for controlling the circulation within said closed circuit.

17. Absorption refrigerating apparatus including a generator-absorber and an evaporator communicating with the generator-absorber, means including a volatile liquid for heating the generator-absorber, means dependent upon the pressure of said volatile liquid for initiating the heating of the generator-absorber, and latch means for suspending the operation of said dependent means to delay the heating of the generator-absorber.

18. Refrigerating apparatus including a generator-absorber and an evaporator, means for heating the generator-absorber, means for supplying fuel to the heating means, means dependent upon the temperature of the generator-absorber for temporarily terminating the fuel supply to the heating means of the generator-absorber and initiating an absorption cycle, means for providing pressure differences between the evaporator and the generator-absorber, means responsive to the pressure of refrigerant within the generator-absorber for governing the dependent means to control the restoration of fuel supply to the generator-absorber for terminating the absorption cycle and initiating another generating cycle.

19. Absorption refrigerating apparatus including a generator-absorber and an evaporator in restricted communication with the generator-absorber, means for heating the generator-absorber, automatic means for initiating said heating means, and means for positively preventing the operation of said automatic means until after the rate of absorption within the generator-absorber becomes less than the rate at which refrigerant is discharged from the evaporator, when the apparatus is charged with a quantity of refrigerant substantially greater than the amount which can ever be absorbed by the generator-absorber during normal operation.

20. Absorption refrigerating apparatus including a generator-absorber and an evaporator in restricted communication with the generator-absorber, means for heating and cooling the generator-absorber, automatic means for discontinuing the cooling and initiating the heating of the generator-absorber, and means for positively preventing the operation of the automatic means until after the generator-absorber is unable to absorb the refrigerant as fast as it is delivered, when the apparatus is charged with a quantity of refrigerant substantially greater than the amount which can ever be absorbed by the generator-absorber during normal operation.

21. Absorption refrigerating apparatus including a generator-absorber and an evaporator in restricted communication with the generator-absorber, means for heating and cooling the generator-absorber, automatic means for discontinuing the cooling means and initiating the heating means, and means responsive to the refrigerant pressure within the generator-absorber for positively preventing the operation of the automatic means until after the refrigerant within the generator-absorber has attained a predetermined pressure during the cooling of the generator-absorber, when the apparatus is charged with a quantity of refrigerant substantially greater than the amount which can ever be absorbed by the generator-absorber during normal operation.

22. Refrigerating apparatus including a generator-absorber and an evaporator, means for heating the generator-absorber, means dependent upon the temperature of the generator-absorber for temporarily terminating the heating of the generator-absorber and initiating an absorption cycle, means for providing pressure differences between the evaporator and the generator-absorber, and means responsive to the pressure of the refrigerant in the generator-absorber for controlling the restoration of the heat supply to the generator-absorber for terminating the absorption cycle and initiating another generating cycle.

23. Refrigerating apparatus including a generator-absorber and an evaporator, means for heating the generator-absorber, control means operated by changes in temperature of the generator-absorber for terminating and initiating the heating of the generator-absorber, a latching means for latching said control means when the heating of the generator-absorber has been terminated, and means actuated after the generator-absorber is unable to carry the refrigerating load for releasing the latching means, when the apparatus is charged with a quantity of refrigerant substantially greater than the amount which can ever be absorbed by the generator-absorber during normal operation.

24. Absorption refrigerating apparatus including a generator-absorber, a condenser, and an evaporator connected by a refrigerant conduit, a closed circuit containing a volatile liquid for heating and cooling the generator-absorber, said closed circuit being in heat exchange relation with the generator-absorber and the condenser, a gas burner for heating the volatile liquid to heat the generator-absorber, a cycling control including a bellows and a lever mechanism responsive to the pressure within said closed circuit provided with a valve for controlling the location of liquid within the closed circuit and provided with a second valve for controlling the flow of gas to the gas burner, an interlock mechanism comprising a bellows responsive to the pressure within the refrigerant conduit and a latch operated thereby for engaging the lever mechanism of the cycling control to hold the gas valve closed and the valve in the closed circuit open until after the pressure within the generator-absorber rises after reaching a predetermined pressure, said refrigerant conduit having a temperature regulator therein comprising a bellows responsive to the pressure within the refrigerant conduit, said bellows carrying a valve and operating a second valve, said second valve controlling the condensing pressure of the refrigerant by controlling the flow of liquid refrigerant to the evaporator and the other valve of the temperature regulator controlling the evaporating pressure within the evaporator, said temperature regulator also having a spring and a means for adjusting the tension of the spring to obtain different evaporating pressures and temperatures within the evaporator, said apparatus being charged with a quantity of refrigerant substantially greater than the amount which can ever be absorbed by the generator-absorber during normal operation.

HARRY F. SMITH.